Nov. 15, 1960 S. K. CLEMENTS Re. 24,895

PORTABLE BOOM SUPPORT ATTACHMENT FOR VEHICLES

Original Filed Feb. 10, 1955 2 Sheets-Sheet 1

INVENTOR.
Shannon K. Clements
BY Oliver D. Olson
Agent

PORTABLE BOOM SUPPORT ATTACHMENT FOR VEHICLES

Original Filed Feb. 10, 1955 2 Sheets-Sheet 2

INVENTOR.
Shannon K. Clements
BY
Oliver D. Olson
Agent

United States Patent Office

Re. 24,895
Reissued Nov. 15, 1960

24,895

PORTABLE BOOM SUPPORT ATTACHMENT FOR VEHICLES

Shannon K. Clements, Elkhart, Ind., assignor of one-half to Hugh M. Rush, Elkhart, Ind.

Original No. 2,864,625, dated Dec. 16, 1958, Ser. No. 487,268, Feb. 10, 1955. Application for reissue Feb. 9, 1959, Ser. No. 792,239

8 Claims. (Cl. 280—34)

Matter enclosed in heavy brackets [ ] appears in the original patent but forms no part of this reissue specification; matter printed in italics indicates the additions made by reissue.

This invention pertains to vehicle-supported booms, and relates particularly to a novel support by means of which booms and other superstructures may be operated in conjunction with small vehicles.

The use of extension booms of various constructions and for diverse purposes such as fire ladders, elevated work stations for such operations as painting of buildings and bridges, has heretofore required the mounting of such booms upon trucks of substantial size in order to provide a sufficiently stable base for the boom as it is swung to its limits of extension and lateral projection. However, it frequently occurs that the massive size of such trucks prevents or inhibits the practical utility of the boom because of limitations in accessibility at the working site. Moreover, the cost of such large transporting equipment renders it economically unfeasible for use by smaller concerns who otherwise could utilize the equipment most advantageously.

Accordingly, it is a principal object of the present invention to provide a boom support in the form of an attachment for small vehicles, such as pick-up trucks, and which attachment functions effectively to provide as stable a support as is afforded by trucks many times larger in size.

Another important object of this invention is the provision of a boom support attachment for small vehicles, which attachment is collapsible to small dimension for easy manipulation of the truck through crowded and restricted areas.

A further important object of this invention is to provide a boom support attachment for small vehicles, which support is selectively adjustable to maintain a desired level independently of the contour of the ground under it.

Still another important object of this invention is the provision of a boom support attachment for small vehicles, which support may be moved while fully extended, to change the location of the boom.

A still further important object of the present invention is to provide a boom support attachment for small vehicles, which attachment is of simplified but sturdy construction for economical manufacture and efficient operation.

These and other objects and advantages of the present invention will appear from the following detailed description, taken in connection with the accompanying drawings, in which.

Figure 2:
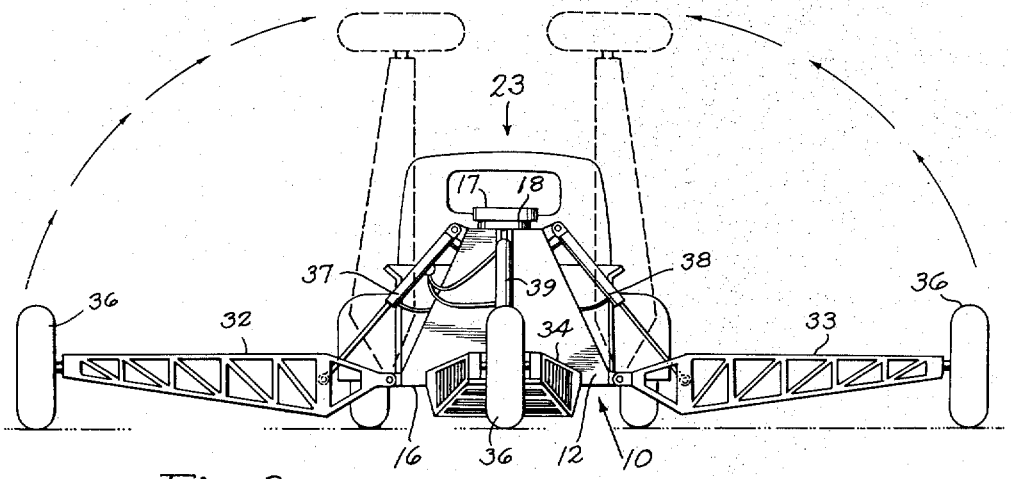
Figure 2 is a view in rear elevation, as viewed from the bottom in Figure 1, and showing the boom support attachment mounted on the rear end of the small truck, the lateral outrigger elements of the support being shown in retracted position in dashed lines.

Referring to the drawings, the support includes a main body 10 which, in the preferred construction illustrated, comprises a hollow container fabricated from steel plates to form a liquid reservoir for purposes described more fully hereinafter. Thus, the body 10 includes front and rear plates 11, 12, respectively, side plates 13, 14, top plate 15, and a bottom plate 16.

Figure 3:
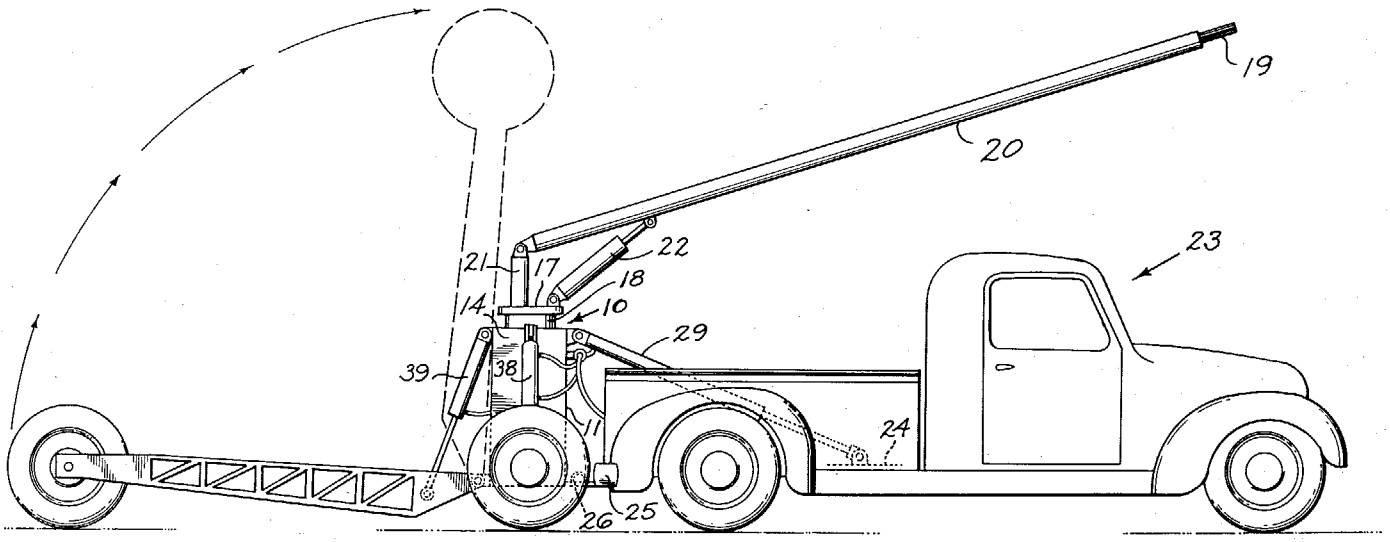
Figure 3 is a view in side elevation showing the boom support attachment mounted upon the rear end of a small truck, the rearwardly extending outrigger element being shown in retracted position in dashed lines.

The body 10 supports on the upper plate 15 thereof a turntable 17 which is mounted upon and driven by a motor 18, preferably of any conventional hydraulic type. The turntable 17 functions to support a boom structure, also of any conventional type, such as the telescoping boom illustrated in Figure 3, wherein an upper section 19 is mounted telescopically within a lower section 20. The lower end of section 20 is pivotally connected to a pedestal 21 mounted on the turntable, and said section is rendered movable in a vertical plane by means of the hydraulic cylinder motor 22 which pivotally interconnects the boom 20 and the turntable 17.

A particular form of boom assembly usable with the support of this invention is disclosed and claimed in my co-pending application, Serial No. 487,267, filed concurrently herewith.

The body 10 is adapted to be mounted detachably upon the rear end of a small truck, such as the pick-up truck 23 illustrated, and which includes a load carrying bed 24 and a rear bumper member 25. The truck is provided with longitudinally and laterally spaced wheels, as shown, the distances between which define the primary support dimensions of the truck. In the embodiment illustrated, the body 10 is detachably connected to the truck by means of a pair of ball joint connections 26, which are of conventional construction. Each ball joint connection includes a male section and a female section, one of which is connected to the body 10 by support 27 and the other section of which is mounted on the bumper element 25 on support 28.

The pair of ball joint connections are spaced apart, for example adjacent the lateral sides of the body 10, and function to secure the latter firmly to the truck. A brace, preferably in the form of a hydraulic cylinder motor 29, is connected pivotally at one end to the forward plate 11 of the body 10, adjacent the top plate 15, and at the opposite end to a bracket 30 secured to the truck bed 24. The brace 29 functions to stabilize the body 10 with respect to the longitudinal axis of the truck, and to control the rotation of the body 10 about an axis extending through the spaced ball joint connection 26, as explained more fully hereinafter.

Mounted pivotally on the lateral sides of the body 10 for pivotal movement in the lateral plane of the latter, by means of the pivot pins 31, are a pair of structural outrigger members 32, 33 which, in the embodiment illustrated, are formed as elongated truss beams. A third outrigger member 34 of similar construction is pivotally mounted on the rear plate 12 by pivot pins 35 for movement in a plane extending substantially normal to the plane of movement of the first two outrigger members mentioned.

Each of the outrigger members preferably is provided at its terminal end with a ground engaging wheel 36, for purposes described in detail hereinafter.

Each of the outrigger members is provided with reciprocating power means by which to pivot the outrigger between extended and retracted position. The power means is preferably of the hydraulic type, although electric or pneumatic systems may be employed, if desired. In the embodiment illustrated, outrigger member 32 is provided with hydraulic cylinder motor 37 which is pivotally connected at one end to side plate 13 and at the opposite, piston rod end to the outrigger member. Similarly, outriggers 33 and 34 are provided with hydraulic cylinder motors 38 and 39, respectively, which pivotally interconnect the outrigger members and the adjacent plates of the body 10.

Figure 4:
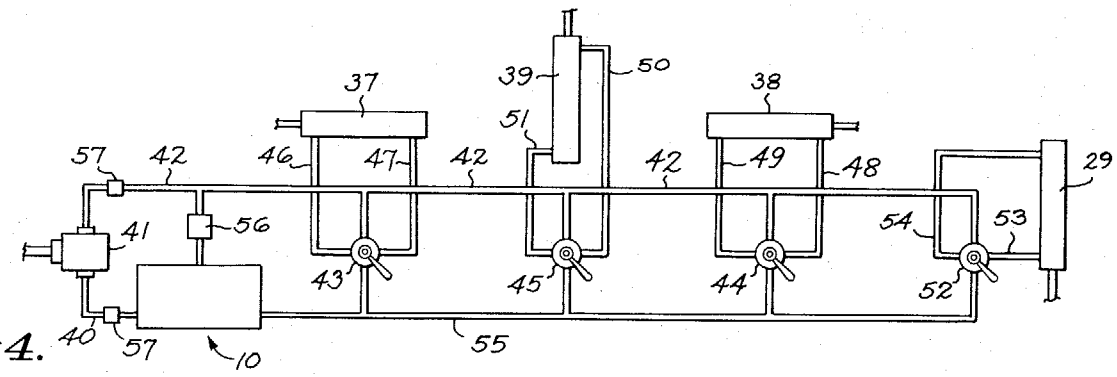
Figure 4 is a schematic diagram of a hydraulic system for operating the power elements of the support.

Referring now particularly to Figure 4 of the drawings, the hydraulic system for the reciprocating cylinder motors 37, 38, 39 is shown to include the hollow body 10, which serves as a reservoir for the hydraulic fluid utilized in the operation of said motors. A conduit 40 connects the reservoir to the intake side of a hydraulic pump 41, which may be powered by any conventional means, such as a power take-off from the truck, or by a separate motor. The outlet side of the hydraulic pump is connected through conduit 42 to each of the four-way valves 43, 44, 45 which control the operation of the hydraulic motors 37, 38, 39, respectively. Thus, for example, valve 43 is connected to motor 37 through conduits 46 and 47 which afford retraction and extension, respectively, of the motor piston rod. Similarly, conduits 48 and 49 connect valve 44 to motor 38 to provide retraction and extension, respectively, of this piston rod, and conduits 50 and 51 connect valve 45 to motor 39 to afford retraction and extension respectively, of its piston rod.

In similar manner, four-way valve 52 is connected to opposite ends of cylinder motor 29 by conduits 53 and 54 to provide retraction and extension of the motor piston rod.

The hydraulic fluid is returned from each of the valves to the reservoir 10 through conduit 55. A safety valve 56 interconnects the outlet side of fluid pump 41 and the reservoir to maintain a predetermined fluid pressure in the system.

In the embodiment illustrated the pump 41 is mounted on the truck 23, and therefore the conduits 40 and 42 are each provided with a conventional quick-detach coupling 57, preferably of the self-sealing type, to facilitate removal of the boom support from the truck. It will be understood that an electric, gasoline or other drive motor may be mounted on the boom support body 10 to drive a pump 41, in which case the couplings 57 may be eliminated.

In the operation of the boom support described hereinbefore the body 10 is mounted upon the truck in the manner previously explained. For transport to a working site, the three outriggers 32, 33, 34 are retracted to the dashed positions shown in Figures 2 and 3, by proper manipulation of the respective valves 43, 44, 45 to retract the piston rods associated with each of the respective hydraulic cylinder motors 37, 38, 39. In this manner the support assembly is reduced to minimum size i.e. the outrigger members 32 and 33 lie within the lateral dimensions of the truck and the rearward outrigger 34 is brought to a position adjacent the body 10. The entire assembly is thus supported by the truck and transported with facility to any desired location capable of being reached by the truck alone.

At the working site the outrigger members are each lowered into contact with the ground or other underlying support. For example, if the support is to be stationed adjacent a building, one of the outriggers may be brought into contact with the building wall, while the other two outriggers placed in contact with the ground, thereby insuring maximum stability for manipulation of the boom. In the event that the working site is located on uneven terrain, each of the outrigger members is adjusted independently so that the turntable 17 is brought to horizontal position. In addition, valve 52 may be manipulated to extend or retract the piston rod of cylinder motor 29 in order to adjust the body 10 to a vertical position, in the event that the truck is positioned on an incline.

Figure 1:
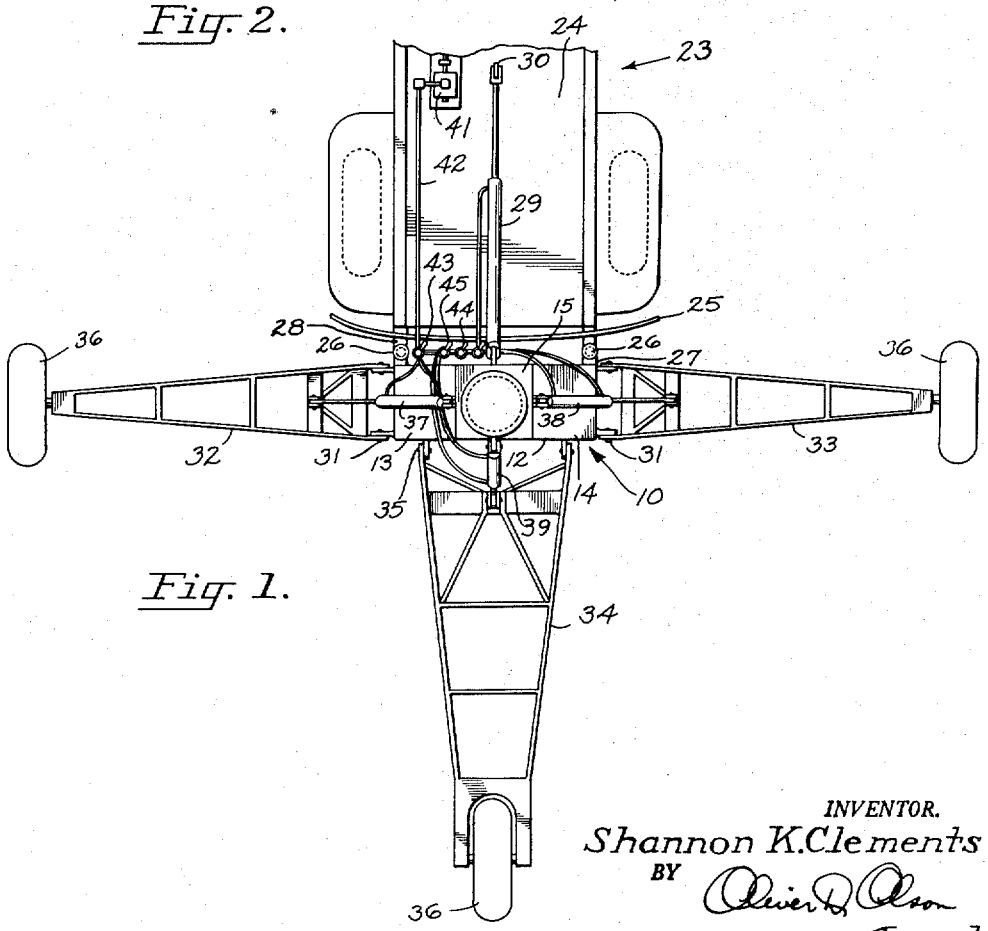
Figure 1 is a plan view of a boom support attachment embodying the features of the present invention, the same being shown in extended position and mounted upon the rear of a small truck.

It will be noted, particularly from Figure 1 of the drawings, that the boom support functions, by its rigid connection to the truck, effectively to substantially double the load-supporting wheel base of the truck and to triple the effective width of the truck. In this manner, the small truck illustrated functions with the support attachment to provide as stable a support for the boom as may be provided by trucks many times its size and cost. For example, booms capable of extension 50 feet in the air and swinging on a circle 60 feet in diameter have been operated with complete safety and maximum efficiency from a conventional ¾ ton pick-up truck, the boom support attachment having outriggers of about eight feet in length.

Detachment of the boom support from the truck is achieved with speed and facility merely by swinging the boom to the rear of the truck while the outriggers are extended, and then disconnecting the couplings 57, the ball joint connectors 26 and the support brace 29 from the truck. The outrigger system thus supports the boom independently of the truck for such purposes as storage, while the truck is used in other capacities.

From the foregoing, it is believed to be apparent that the present invention provides novel means by which to support load carrying booms and similar devices of substantial size, by means of relatively small trucks and other vehicles heretofore incapable of such use. The boom support is of simplified construction, and therefore economical to manufacture. It is rugged in construction, to accommodate use in the manner explained, and requires but a minimum of maintenance and repair. It is manipulated with speed and facility between retracted and extended positions and is readily detached from and attached to the vehicle employed to support and transport it.

It will be apparent to those skilled in the art that various changes may be made in the details of construction described hereinbefore without departing from the scope and spirit of this invention. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

1. A support for booms and the like, adapted to be detachably mounted on a vehicle, said support comprising a body, adjustable connecting means on the body for securing the same to a vehicle adjustably on an axis extending transversely of the vehicle, reciprocating power means mounted pivotally on the body for connecting the body to a vehicle at a point on the vehicle spaced longitudinally from the transversely mounted body for adjusting and securing the body in levelled position on said transverse axis, base means on the support for mounting a boom or the like thereon, elongated outrigger members mounted pivotally on the opposite lateral sides and on the rearward side of the body, ground engaging means on the terminal ends of the outrigger members, said members being adapted to be pivoted between a retracted position projecting upwardly adjacent the body and an extended position projecting outwardly from the body, in which extended position the ground engaging means are disposed a substantial distance outwardly from the vehicle, whereby to increase substantially the effective supporting length and width of the vehicle, and reciprocating power means pivotally interconnecting the outrigger members and the body for operating said members arcuately between extended and retracted positions.

2. A support for booms and the like, adapted to be detachably mounted on a vehicle, said support comprising a body, connecting means on the body for detachably securing the same pivotally to the rear end of a vehicle on an axis extending transversely of the vehicle, reciprocating power means pivotally connecting the body to the vehicle at a point forwardly of the rear end of the latter for adjusting and securing the body in levelled position on said transverse axis, base means on the support for mounting a boom or the like thereon, elongated outrigger members mounted pivotally on the opposite lateral sides and on the rearward side of the body, ground engaging means on the terminal ends of the outrigger members, said members being adapted to be pivoted between a retracted position projecting upwardly adjacent the body and an extended position projecting outwardly from the body, in which extended position the ground engaging means are disposed a substantial distance outwardly from the vehicle, whereby to increase substantially the effective supporting length and width of the vehicle, and reciprocating power means pivotally interconnecting the outrigger members and the body for operating said members.

3. A support for booms and the like, adapted to be detachably mounted on a vehicle, said support comprising a hollow body adapted to contain hydraulic fluid, connecting means on the body for securing the same to a vehicle, base means on the support for mounting a boom or the like thereon, elongated outrigger members mounted pivotally on the opposite lateral sides and on the rearward side of the body, ground engaging means on the terminal ends of the outrigger members, said members being adapted to be pivoted between a retracted position projecting upwardly adjacent the body and an extended position projecting outwardly from the body, in which extended position the ground engaging means are disposed a substantial distance outwardly from the vehicle, whereby to increase substantially the effective supporting length and width of the vehicle, hydraulic reciprocating power means interconnecting the outrigger members and the body for operating said members, conduit means interconnecting the power means and the hollow body for supplying said fluid to the power means, and valve means in said conduit means for controlling the operation of the power means.

4. For use with a vehicle having longitudinally and laterally spaced traction elements defining the primary support dimensions of the vehicle: secondary support means for temporarily increasing the effective support dimensions of the vehicle, comprising a hollow body adapted to contain hydraulic fluid, means securing the body on a vehicle, a plurality of elongated outrigger members each mounted pivotally at one end on the body and having ground engaging means on the terminal end thereof, the outrigger members being pivotable between a retracted position projecting upwardly adjacent the vehicle and an extended position projecting outward from the vehicle with their said ground engaging means disposed a substantial distance outward from the vehicle, hydraulic power means interconnecting the outrigger members and body for moving said members between said retracted and extended positions, and conduit means connecting the hydraulic power means to the hollow body for supplying fluid to said hydraulic means.

5. A support for booms and the like adapted to be mounted on a vehicle having longitudinally and laterally spaced traction elements defining the primary support dimensions of the vehicle, said support comprising a body, base means on the body for mounting a boom or the like thereon, means securing the body on a vehicle for pivotal movement on an axis extending transversely of the vehicle, adjustable connecting means connecting the body to the vehicle for leveling the base means on said transverse pivot axis, a plurality of elongated outrigger members each mounted pivotally at one end on the body and having ground engaging means on the terminal end thereof, the outrigger members being pivotable between a retracted position projecting upwardly adjacent the vehicle and an extended position projecting outward vehicle and an extended position projecting outward from the vehicle with their said ground engaging means disposed a substantial distance outward from the vehicle, and power means pivotally interconnecting the outrigger members and body for moving said members between said retracted and extended positions.

6. A support for booms and the like adapted to be mounted on a vehicle having longitudinally and laterally spaced traction elements defining the primary support dimensions of the vehicle, said support comprising a hollow body adapted to contain hydraulic fluid, base means on the body for mounting a boom or the like thereon, means securing the body on a vehicle for pivotal movement transversely of the vehicle, hydraulic adjustable connecting means connecting the body to the vehicle for leveling the base means on said transverse pivot axis, a plurality of elongated outrigger members each mounted pivotally at one end on the body and having ground engaging means on the terminal end thereof, the outrigger members being pivotable between a retracted position projecting upwardly adjacent the vehicle and an extended position projecting outward from the vehicle with their said ground engaging means disposed a substantial distance outward from the vehicle, hydraulic power means interconnecting the outrigger members and body for moving said members between said retracted and extended positions, and conduit means connecting the hydraulic connecting means and power means to the hollow body for supplying fluid to said hydraulic means.

*7. A support for booms and the like adapted to be mounted on a vehicle, said support comprising a body, turntable base means mounted on the body for rotation on a vertical axis for mounting a boom or the like thereon, pivot means for securing and supporting the body entirely upon a vehicle for pivotal movement on an axis extending transversely of the vehicle, and elongated adjustably extensible connecting means connected pivotally at one end to the body and arranged for pivotal connection at its opposite end to a vehicle for adjusting and securing the turntable base means in leveled position on said transverse axis.*

*8. The support of claim 7 including a plurality of vertically retractable outrigger members mounted pivotally on the body and each having ground engaging means on the terminal end thereof, and power means interconnecting the outrigger members and body for pivoting said members between said vertically retracted position and an extended position laterally outward of the vehicle for increasing the lateral support dimensions of the vehicle and for leveling the turntable base means in the longitudinal direction of the vehicle.*

References Cited in the file of this patent or the original patent

UNITED STATES PATENTS

| | | |
|---|---|---|
| 1,559,880 | Ionides | Nov. 3, 1925 |
| 1,707,518 | Garson | Apr. 2, 1929 |
| 2,152,700 | Le Bleu | Apr. 4, 1939 |
| 2,293,328 | Coburn | Aug. 18, 1942 |
| 2,365,169 | Billings | Dec. 19, 1944 |
| 2,452,632 | Cameron | Nov. 2, 1948 |
| 2,459,098 | Simmons | Jan. 11, 1949 |
| 2,589,102 | LeTourneau | Mar. 11, 1952 |
| 2,595,864 | Lowry | May 6, 1952 |
| 2,598,517 | Drott | May 27, 1952 |
| 2,646,968 | Curtis | July 28, 1953 |
| 2,647,758 | Ryan | Aug. 4, 1953 |
| 2,683,584 | Selberg | July 13, 1954 |
| 2,750,060 | Sheriff | June 12, 1956 |
| 2,820,561 | Meagher | Jan. 21, 1958 |

FOREIGN PATENTS

| | | |
|---|---|---|
| 252,815 | Germany | Feb. 28, 1912 |
| 713,324 | Great Britain | Aug. 11, 1954 |